US 9,716,662 B2

(12) United States Patent
Oikawa (10) Patent No.: US 9,716,662 B2
(45) Date of Patent: Jul. 25, 2017

(54) COMMUNICATION SYSTEM, SWITCH, CONTROL APPARATUS, PACKET PROCESSING METHOD, AND PROGRAM

(71) Applicant: NEC Corporation, Tokyo (JP)

(72) Inventor: Seiji Oikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 31 days.

(21) Appl. No.: 14/772,890

(22) PCT Filed: Mar. 5, 2014

(86) PCT No.: PCT/JP2014/055691
§ 371 (c)(1),
(2) Date: Sep. 4, 2015

(87) PCT Pub. No.: WO2014/136853
PCT Pub. Date: Sep. 12, 2014

(65) Prior Publication Data
US 2016/0014036 A1    Jan. 14, 2016

(30) Foreign Application Priority Data

Mar. 6, 2013 (JP) ................................ 2013-043909

(51) Int. Cl.
*H04L 12/855* (2013.01)
*H04L 12/851* (2013.01)
(Continued)

(52) U.S. Cl.
CPC ........ *H04L 47/2466* (2013.01); *H04L 45/302* (2013.01); *H04L 45/308* (2013.01);
(Continued)

(58) Field of Classification Search
CPC .... H04L 47/2466; H04L 45/302; H04L 45/38
See application file for complete search history.

(56) References Cited

U.S. PATENT DOCUMENTS 8,605,734 B2    12/2013 Ichino
2011/0261825 A1*  10/2011 Ichino ..................... H04L 45/38
370/400

(Continued)

FOREIGN PATENT DOCUMENTS

JP    2006-115362 A    4/2006
JP    2011-170718 A    9/2011
(Continued)

OTHER PUBLICATIONS

International Search Report (ISR) (PCT Form PCT/ISA/210), in PCT/JP2014/055691, dated Jun. 10, 2014.
(Continued)

*Primary Examiner* — Albert T Chou
(74) *Attorney, Agent, or Firm* — McGinn IP Law Group, PLLC.

(57) ABSTRACT

A communication system contains a control apparatus and switch(es). The control apparatus transmits, to a switch, two or more flow entries having an identical match condition but having different processing content to be applied, and a condition for changing application priorities of the two or more flow entries. The switch holds the two or more flow entries, and switches the application priorities in accordance with the condition specified by the control apparatus, to process received packet(s).

20 Claims, 9 Drawing Sheets (51) Int. Cl.
*H04L 12/725* (2013.01)
*H04L 12/721* (2013.01)
*H04L 12/715* (2013.01)
*H04L 12/717* (2013.01)

(52) U.S. Cl.
CPC .............. *H04L 45/38* (2013.01); *H04L 45/42* (2013.01); *H04L 45/64* (2013.01); *H04L 47/2441* (2013.01)

(56) References Cited

U.S. PATENT DOCUMENTS

| | | | |
|---|---|---|---|
| 2012/0020361 A1* | 1/2012 | Ueno | H04L 49/50 370/400 |
| 2012/0039338 A1* | 2/2012 | Morimoto | H04L 47/125 370/392 |
| 2013/0124707 A1* | 5/2013 | Ananthapadmanabha | H04L 45/7457 709/223 |

FOREIGN PATENT DOCUMENTS

| | | |
|---|---|---|
| JP | 2012-049674 A | 3/2012 |
| JP | 2013-005125 A | 1/2013 |
| JP | 2013-046134 A | 3/2013 |
| WO | WO 2010/103909 A1 | 9/2010 |
| WO | WO 2012/077259 A1 | 6/2012 |

OTHER PUBLICATIONS

Nick McKeown and seven others, "OpenFlow: Enabling Innovation in Campus Networks", [online], [Search performed on Feb. 18, 2013], Internet <URL: http://www.openflow.org/documents/openflow-wp-latest.pdf>.

"OpenFlow Switch Specification" Version 1.3.1 (Wire Protocol 0x04), [online], [Search performed on Feb. 18, 2013], <Internet URL: https://www.opennetworking.org/images/stories/downloads/specification/openflow-spec-v1.3.1.pdf>.

* cited by examiner

| SWITCH ID | PORT NUMBER | NUMBER OF DROPPED PACKETS |
|---|---|---|
| | | |

| ENTRY ID | MATCH CONDITION | ACTION | RELATED ENTRY ID | PRIORITY AMONG RELATED ENTRIES | COUNTER |
|---|---|---|---|---|---|
| 5000 | In port=C | Output port A | 5001 | 1 | 6 |
| 5001 | In port=C | Output port B | 5000 | 2 | 6 |
| .. | .. | .. | .. | .. | .. |

COMMUNICATION SYSTEM, SWITCH, CONTROL APPARATUS, PACKET PROCESSING METHOD, AND PROGRAM

TECHNICAL FIELD

Cross-Reference to Related Applications

The present application claims priority from Japanese Patent Application No. 2013-043909 (filed on Mar. 6, 2013) the content of which is hereby incorporated in its entirety by reference into this specification. The present invention relates to a communication system, a switch, a control apparatus, a packet processing method, and a program, and in particular, relates to a communication system, a switch, a control apparatus, a packet processing method, and a program, where the control apparatus is arranged to centrally control the switch.

BACKGROUND

In recent years, technology known as OpenFlow has been proposed (see Non-Patent Literature 1 and 2). In OpenFlow, communication is taken as end-to-end flow, and path control, failure recovery, load balancing, and optimization are performed on a per-flow basis. An OpenFlow switch as specified in Non-Patent Literature 2 is provided with a secure channel for communication with an OpenFlow controller, and operates according to a flow table in which addition or rewriting is instructed as appropriate by the OpenFlow controller. In the flow table, for each flow there are definitions of sets of match conditions (Match Fields) for collation with packet headers, flow statistical information (Counters), and instructions (Instructions) that define processing content (see "5.2 Flow Table" in Non-Patent Literature 2).

For example, when an OpenFlow switch receives a packet, a search is made for an entry having a match condition (see "5.3 Matching" in Non-Patent Literature 2) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Instructions field of the entry in question, for the received packet. On the other hand, as a result of the search, in a case where an entry matching the received packet is not found, the OpenFlow switch transmits a request for entry configuration to the OpenFlow controller via the secure channel, that is, a request for transmission of control information for processing the received packet. The OpenFlow switch receives a flow entry with processing content determined and updates the flow table. In this way, the OpenFlow switch performs packet forwarding using entries stored in the flow table as control information.

Patent Literature 1 discloses a configuration where, in a communication system using the abovementioned OpenFlow, an OpenFlow controller generates and transmits an encapsulated packet in which a flow entry for recording and a normal packet are related, and flow entries can be collectively recorded in an OpenFlow switch on a particular path.

Patent Literature 2 discloses a configuration where, in a communication system using the abovementioned OpenFlow, when a plurality of service-providing servers that provide a service to a client terminal issue a load balancing request to an OpenFlow controller, the OpenFlow controller changes flow entry (entries) configured in the switch.

PATENT LITERATURE (PTL)

[PTL 1] International Publication No. WO2010/103909
[PTL 2] Japanese Patent Kokai Publication No. JP2011-170718A

NON PATENT LITERATURE (NPL)

[NPL 1] Nick McKeown and seven others, "OpenFlow: Enabling Innovation in Campus Networks", [online], [Search performed on Feb. 18, 2013], Internet <URL: http://www.openflow.org/documents/openflow-wp-latest.pdf>
[NPL 2] "OpenFlow Switch Specification" Version 1.3.1 (Wire Protocol 0x04), [online], [Search performed on Feb. 18, 2013], <Internet URL: https://www.opennetworking.org/images/stories/downloads/specification/openflow-spec-v1.3.1.pdf>

SUMMARY

The following analysis is given according to the present invention. In the OpenFlow network described above, when a path is once calculated by an OpenFlow controller, packets are forwarded by the path in question until communication is ended. Although path change may be performed as in Patent Literature 2, in such a case also, as long as a new load balancing request is not made, packet forwarding by the relevant path after the change is continued. In this type of centrally controlled network, as a result of path calculation by a control apparatus thereof, a phenomenon occurs where traffic becomes concentrated in a particular link only.

Clearly, if the OpenFlow controller continuously monitors traffic and rewrites flow entries to change paths, the abovementioned problem can be resolved, but, as in the problem of Patent Literature 1, the increasing load on the OpenFlow controller is not practicable.

It is an object of the present invention to provide a communication system, a switch, a control apparatus, a packet processing method and a program, which can contribute to improving flexibility of path control in a centrally controlled network as represented by OpenFlow described above.

According to a first aspect there is provided a communication system that includes: a control apparatus that transmits, to a switch, 2 or more flow entries having an identical match condition but different processing content to be applied, and a condition for changing application priority among the 2 or more flow entries; and a switch that holds the 2 or more flow entries and switches application priority in accordance with a condition specified by the control apparatus, to process received packet(s).

According to a second aspect there is provided a switch, connected to a control apparatus that transmits to the switch 2 or more flow entries having an identical match condition but different processing content to be applied, and a condition for changing application priority among the 2 or more flow entries; the switch holding the 2 or more flow entries, and switching application priority in accordance with a condition prescribed by the control apparatus, to process received packet(s).

According to a third aspect there is provided a control apparatus that transmits to a switch which holds 2 or more flow entries having an identical match condition but different processing content to be applied, and switches application priority among the 2 or more flow entries in accordance with a specified condition, to process received packet(s), the control apparatus transmitting the 2 or more flow entries and the condition for changing the application priority among the 2 or more flow entries.

According to a fourth aspect there is provided a packet processing method that includes: receiving, from a control apparatus, 2 or more flow entries having an identical match condition but different processing content to be applied, and a condition for changing application priority among the 2 or more flow entries; and holding the 2 or more flow entries and switching application priority in accordance with a condition specified by the control apparatus, to process received packet(s). This method is associated with a particular mechanism known as a switch that processes received packets by referring to flow entries that are configured from outside.

According to a fifth aspect there is provided a program that executes on a computer which controls a switch that holds 2 or more flow entries having an identical match condition but different processing content to be applied, and switches application priority among the 2 or more flow entries in accordance with a specified condition, to process received packet(s), the program executing a process of creating the 2 or more flow entries and a condition for changing application priority among the 2 or more flow entries; and a process of transmitting the 2 or more flow entries and the condition to the switch. It is to be noted that this program may be recorded on a computer-readable (non-transient) storage medium. That is, the present invention may be embodied as a computer program product.

The meritorious effects of the present invention are summarized as follows.

According to the present invention, it is possible to contribute to improving flexibility in path control in a centrally controlled network as represented by OpenFlow described above. That means that the present invention transforms the prior art structure into a centralized control network which has improved flexibility in path control.

PREFERRED MODES

First, a description is given of an outline of exemplary embodiments of the present disclosure, making reference to the drawings. It is to be noted that reference symbols in the drawings attached to this outline are added to respective elements for convenience, as examples in order to aid understanding, and are not intended to limit the present disclosure to modes illustrated in the drawings.

Figure 1:
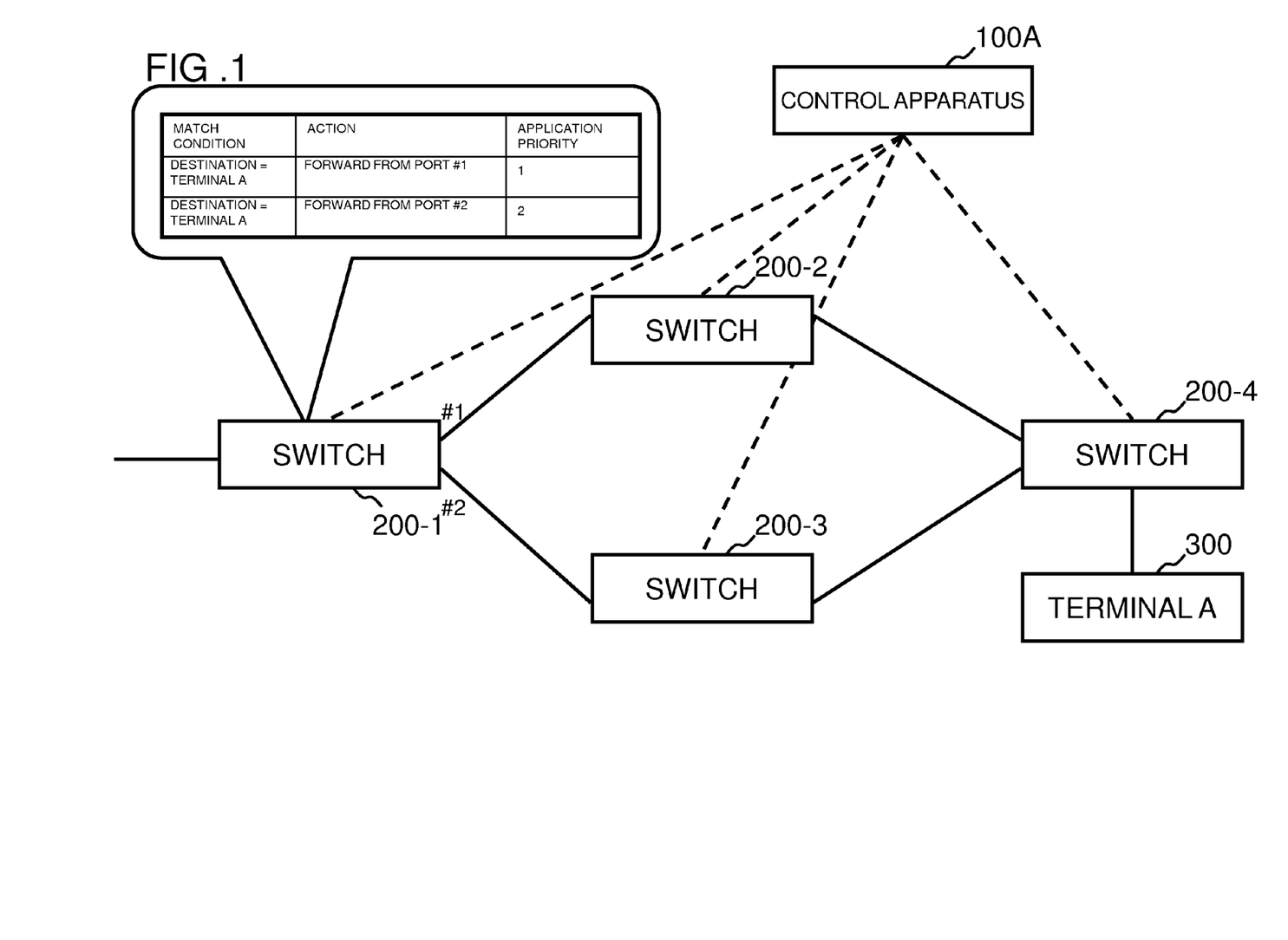
FIG. 1 is a diagram showing a configuration of a first exemplary embodiment of the present disclosure.

The present disclosure may be implemented, in an exemplary embodiment thereof as shown in FIG. 1, by a communication system including a control apparatus 100A and switches 200-1 to 200-4, where the control apparatus 100A controls the switches 200-1 to 200-4, and the switches 200-1 to 200-4 process received packets by referring to flow entries configured by the control apparatus 100A.

More specifically, the control apparatus 100A, for example, transmits and holds two or more flow entries having an identical match condition but having different processing content to be applied, and a condition for changing application priorities of the two of more flow entries.

The switch 200-1 processes a received packet using the flow entry, by switching application priority in accordance with the condition specified by the control apparatus. For example, the processing content of forwarding (forwarding from port #1) to switch 200-2 is configured in one of the two or more flow entries, and processing content of forwarding (forwarding from port #2) to switch 200-3 is configured in another thereof. For example, when a condition is configured for changing application priority of the respective flow entries for each of a prescribed number of packets received, the switch 200-1 performs an operation of switching forwarding (forwarding from port #1) to switch 200-2 and forwarding (forwarding from port #2) to switch 200-3, for each of a prescribed number of packets received.

By so doing, a path change operation is implemented on the switch side alone. It is to be noted that in the above-mentioned example, a packet forwarding operation is configured in processing content configured in each of two flow entries, but it is also possible to configure processing content otherwise. For example, if processing content is configured to drop a packet in one of the flow entries, it is also possible to perform an operation such as packet policing.

First Exemplary Embodiment

Figure 2:
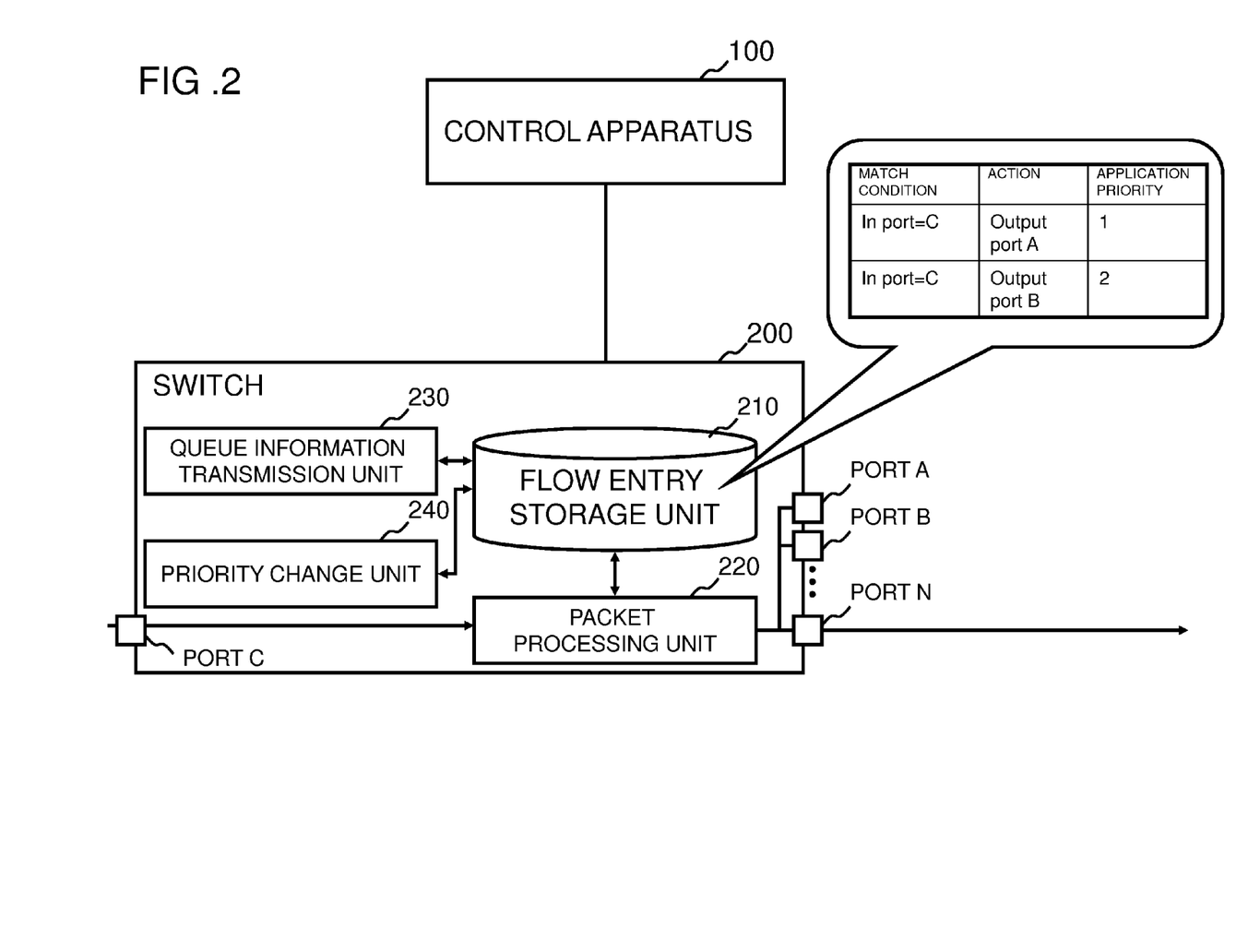
FIG. 2 is a diagram showing a configuration of a communication system in the first exemplary embodiment of the present disclosure.

Next, a detailed description is given concerning a first exemplary embodiment of the present disclosure, making reference to the drawings. FIG. 2 is a diagram showing a configuration of a communication system in the first exemplary embodiment of the present disclosure. FIG. 2 shows a configuration in which a control apparatus 100 and a switch 200 are connected via a control channel.

The switch 200 is provided with a plurality of ports A to N, a flow entry storage unit 210 that stores flow entries transmitted from the control apparatus 100, a packet processing unit 220, a queue information transmission unit 230, and a priority change unit 240.

On receiving a packet from port C in FIG. 2, for example, the packet processing unit 220 searches for a flow entry having a match condition that matches the received packet, from the flow entry storage unit 210. As a result of the search, in a case where a flow entry having a match condition that matches the received packet is found, the packet processing unit 220 applies processing content configured in a processing content field (action field) of the flow entry to the received packet.

Figure 3:
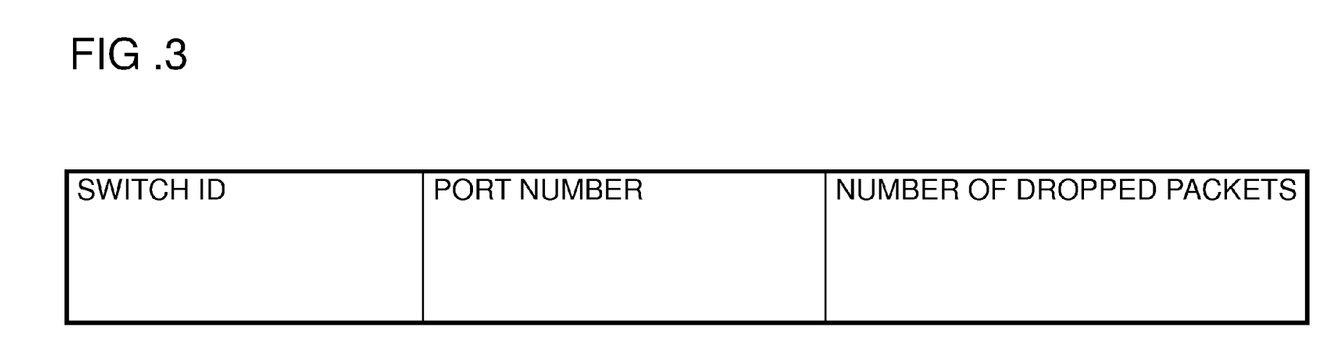
FIG. 3 is a diagram showing an example of queue information exchanged between a control apparatus and a switch in the first exemplary embodiment of the disclosure.

The queue information transmission unit 230 transmits queue information at prescribed intervals to the control apparatus 100. The queue information, as shown in FIG. 3, is the counted number of packets dropped without being accumulated in a transmission queue for each port of the switch. It is possible to quantitatively comprehend whether or not a bandwidth deficiency has occurred and the extent thereof, in the port in question according to the number of dropped packets included in this queue information. It is to be noted that switch ID in FIG. 3 is an ID (Datapath ID) uniquely assigned to each switch.

The priority change unit 240, as detailed later, performs an operation to change priorities among distributed processing flow entries having an identical match condition configured, based on a condition configured by the control apparatus 100. In the present exemplary embodiment, the priority change unit 240 compares a flow entry counter value and a threshold specified by the control apparatus 100, and in a case where the flow entry counter value exceeds the threshold, clears the counter and also changes application priority (priority among related entries in FIG. 5) among flow entries with an identical match condition (details are described later).

Figure 4:
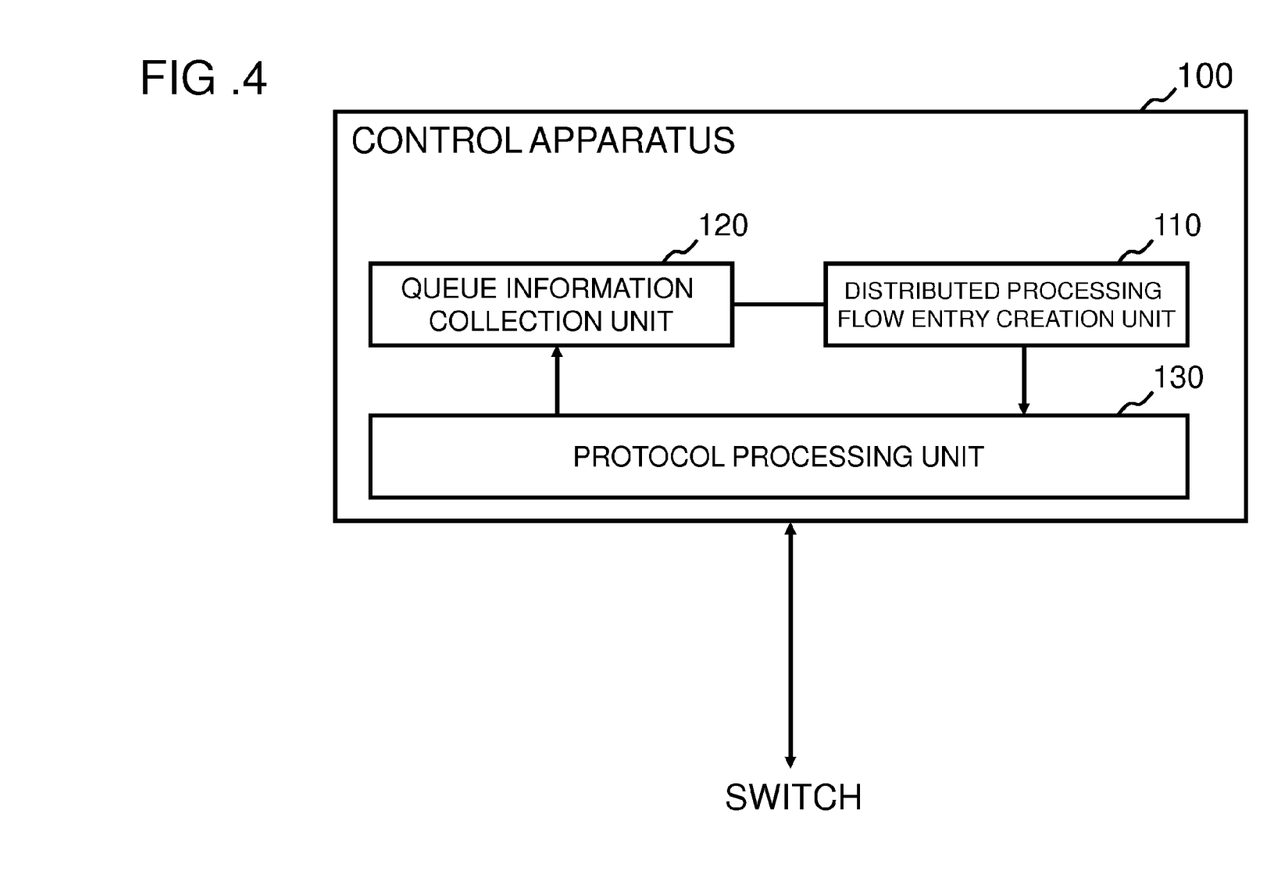
FIG. 4 is a diagram showing a configuration of the control apparatus in the first exemplary embodiment of the disclosure.

FIG. 4 is a diagram showing a configuration of the control apparatus 100 in the first exemplary embodiment of the present disclosure. Referring to FIG. 4, the control apparatus 100 is provided with a distributed processing flow entry creation unit 110, a queue information collection unit 120, and a protocol processing unit 130 for communicating by a prescribed protocol (for example, OpenFlow protocol of Non-Patent Literature 2) with a switch.

The distributed processing flow entry creation unit 110 creates a distributed processing flow entry to be configured in the switch 200. It is to be noted that the distributed processing flow entry creation unit 110 may create a normal flow entry. Clearly, separately from the distributed processing flow entry creation unit 110, a flow entry creation unit may be provided that creates a flow entry based on a result of path calculation or terminal location.

Figure 5:
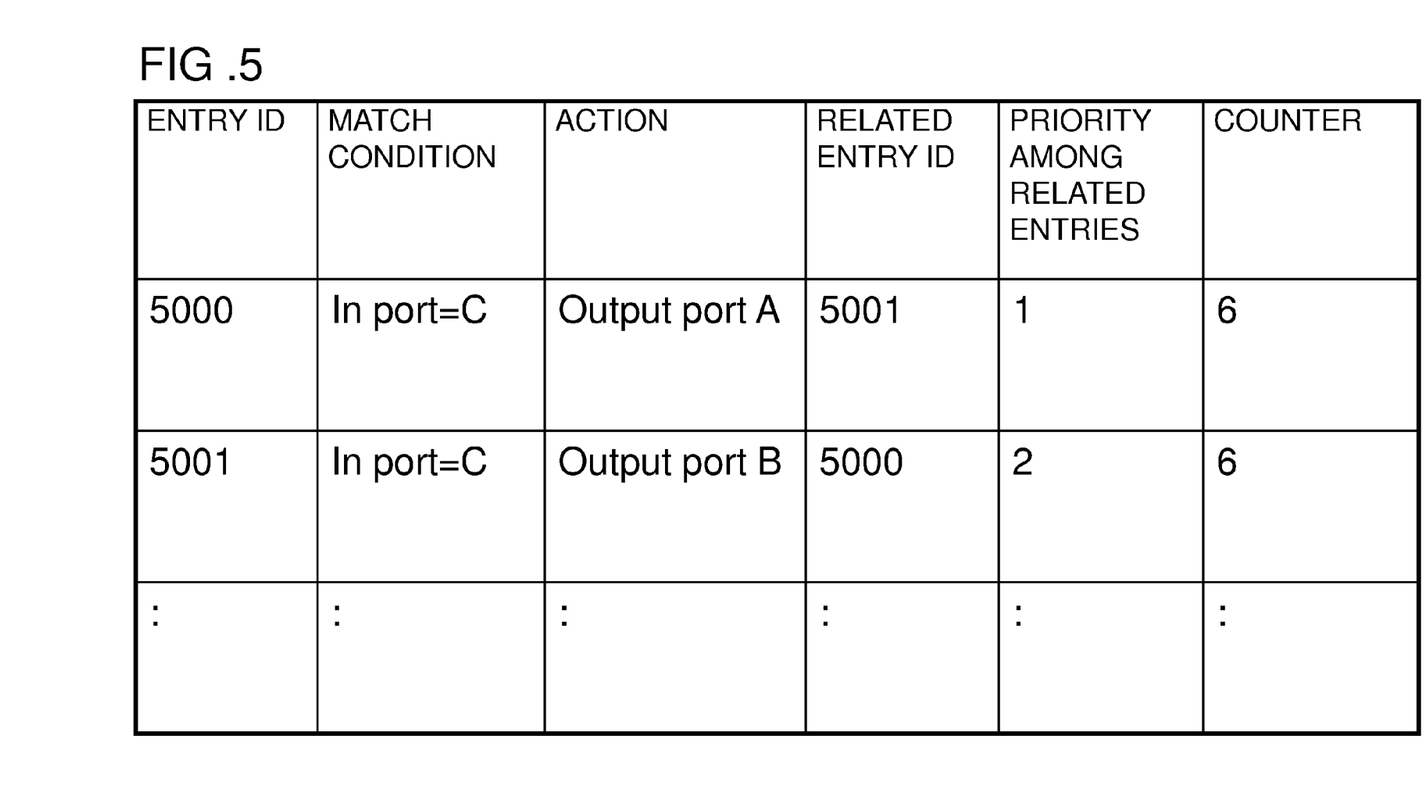
FIG. 5 is a diagram showing an example of a flow entry with distributed processing configured in a switch by the control apparatus of the first exemplary embodiment of the disclosure.

FIG. 5 is a diagram showing an example of distributed processing flow entries. FIG. 5 shows entries that associate entry ID, match condition, action, related entry ID, priority among related entries, and counter.

The entry ID is an identifier that is configured in order to uniquely identify a flow entry at least within a switch.

The match condition field is a field for configuring a match condition for collating with header information or the like of a received packet. As the match condition, in the example of FIG. 5, a condition is configured in which an "In port" is port C. Clearly, besides an input port ("In port"), it is possible to configure a MAC (Media Access Protocol) address (source/destination), an IP (Internet Protocol) address (source/destination), or a TCP/UDP (Transmission Control Protocol/User Datagram Protocol) port number (source/destination), etc.

The action field is a field for configuring processing content to be applied to a packet that matches a match condition. In the example of FIG. 5, an entry (Output port A) configuring an action specifying output (forwarding) from port A as an action, and an entry (Output port B) configuring an action specifying output (forwarding) from port B, are configured as actions. It is to be noted that in an action field, not only an Output action, but also another action (header rewriting, dropping, reference to another table, or the like) can be configured.

The related entry ID is a field that configures the ID of a related entry with an identical match condition but a different action field. In the example of FIG. 5, 5001 is configured in a related entry ID of flow entry with entry ID=5000, and 5000 is configured in a related entry ID of flow entry with entry ID=5001. That is, the example shows that the flow entry with entry ID=5000 and the flow entry with entry ID=5001 are related entries (distributed processing flow entry set) with an identical match condition but different action fields. It is to be noted that in the example of FIG. 5, a case with 2 related entries is shown, but there may also be 3 or more related entries. Where a related entry is blank, the flow entry thereof may be handled as a normal flow entry.

Priority among related entries indicates application priority among the aforementioned related entries. In the example of FIG. 5, the smaller the numerical value, the higher the application priority. For example, in a case where a packet is received from port C, the flow entry with entry ID=5000 and the flow entry with entry ID=5001 are hit, but the flow entry with entry ID=5000, which has higher priority among related entries, is selected.

The counter field is a field that holds a count value of the number of packets applied to a match condition. In the present exemplary embodiment, by comparing the counter value with a prescribed threshold, the application priority among related entries is changed. It is to be noted that flow statistical information for each entry recorded by an OpenFlow switch of Non-Patent Literature 2 may be used as the counter, but counters may also be set individually.

As described above, a flow entry may be configured by adding fields storing entry ID, related entry ID, priority among related entries, and the like, to a flow entry described in "5.2 Flow Table" of Non-Patent Literature 2.

The queue information collection unit 120 performs operations of receiving queue information from the queue information transmission unit 230 of the switch 200, and storing this for a prescribed time period.

It is to be noted that the respective parts (processing means) of the control apparatus 100 and switch 200 shown in FIG. 2 and FIG. 4 may be implemented by a computer program that executes the abovementioned respective processes on a computer configuring these apparatuses, using hardware thereof.

Figure 6:
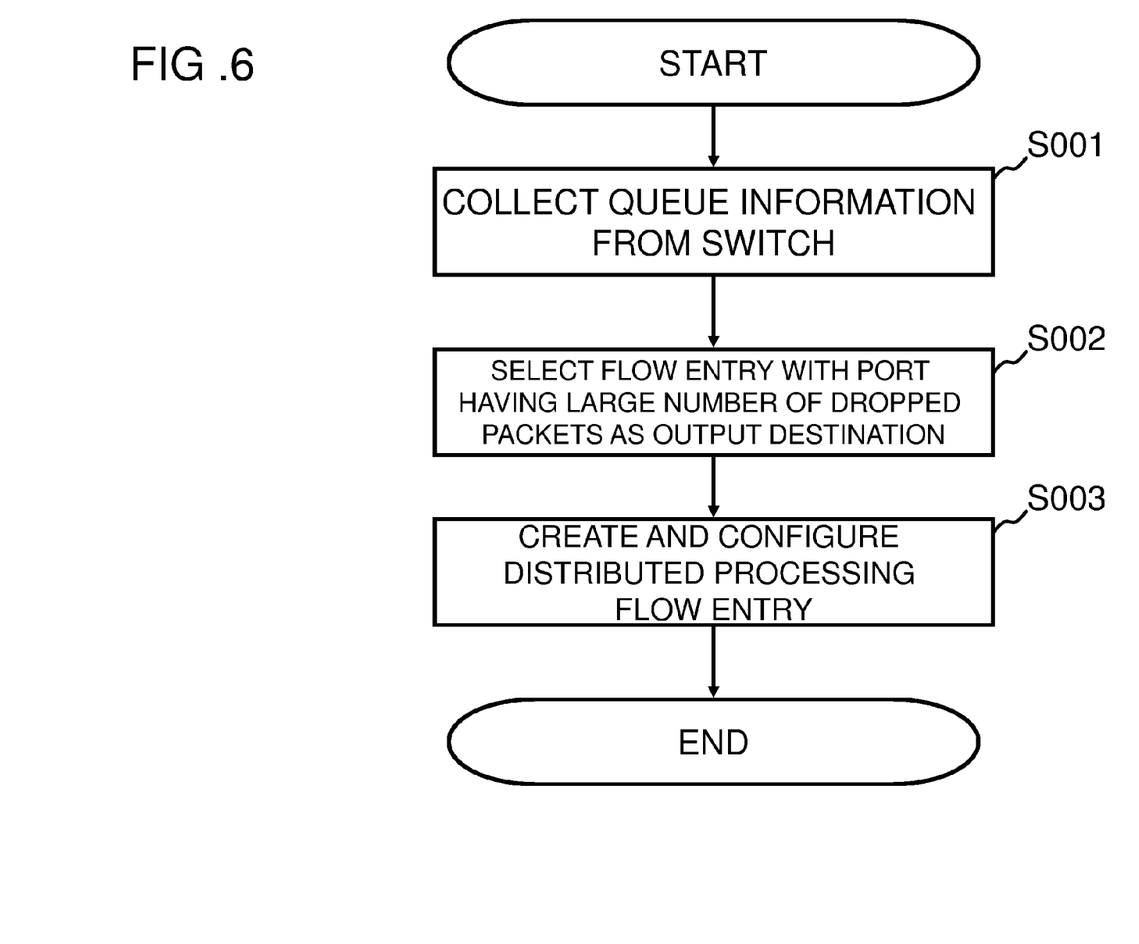
FIG. 6 is a flowchart showing operations of the control apparatus in the first exemplary embodiment of the disclosure.

Next, a detailed description is given concerning operations of the present exemplary embodiment, making reference to the drawings. FIG. 6 is a flowchart showing operations of the control apparatus in the first exemplary embodiment of the disclosure. Referring to FIG. 6, the control apparatus 100 collects queue information as exemplified in FIG. 3 from the switch 200 at prescribed time intervals (step S001). It is to be noted with regard to transmission units for queue information, queue information for each port shown in FIG. 3 may be individually transmitted as a unit, or the queue information shown in FIG. 3 may be transmitted collectively for each switch. If, as in the latter, the queue information shown in FIG. 3 is transmitted collectively for each switch, it is possible to reduce the number of transmissions of queue information.

Next, the control apparatus 100 selects a flow entry to be changed to a distributed processing flow entry, from among flow entries that have been configured in the switch, based on received queue information (step S002). Specifically, the control apparatus 100 selects a flow entry with a port having many dropped packets as shown in the queue information, as an output destination.

Next, the control apparatus 100 creates a distributed processing flow entry, to be configured by rewriting in the abovementioned flow entry, and configures this in the relevant switch (step S003). For example, in an identical match condition, a flow entry outputting from port A of switch 200 of FIG. 7, and a flow entry outputting from port B of switch 200 of FIG. 8 are created and configured in a switch as shown in FIG. 5. The control apparatus 100 transmits a condition to change priority to be applied to a distributed processing flow entry, to the switch 200. For example, a condition is transmitted such as: when the counter is 100. The transmitted condition to change priority is held in the priority change unit 240 of the switch 200.

An arrangement may be made to enable specifying of a method of changing priority when the condition is realized. The simplest method is one of switching the priorities of 2 flow entries. Besides this, in a case of 3 or more distributed processing flow entries, it is possible to use a method in which the priority of a flow entry having second place priority or lower is raised by 1, and the priority of a flow entry having the previous highest priority is lowered to the lowest position.

In the above way, processing on the control apparatus 100 side is completed. Thereafter, operations on the switch 200 side are performed, and on receiving a packet matching a distributed processing flow entry, the switch 200 selects a flow entry with a higher application priority, and processes the packet. At this time, the switch 200 updates the counter and changes the application priorities among distributed processing flow entries, by a condition specified by the control apparatus 100.

Figure 7:
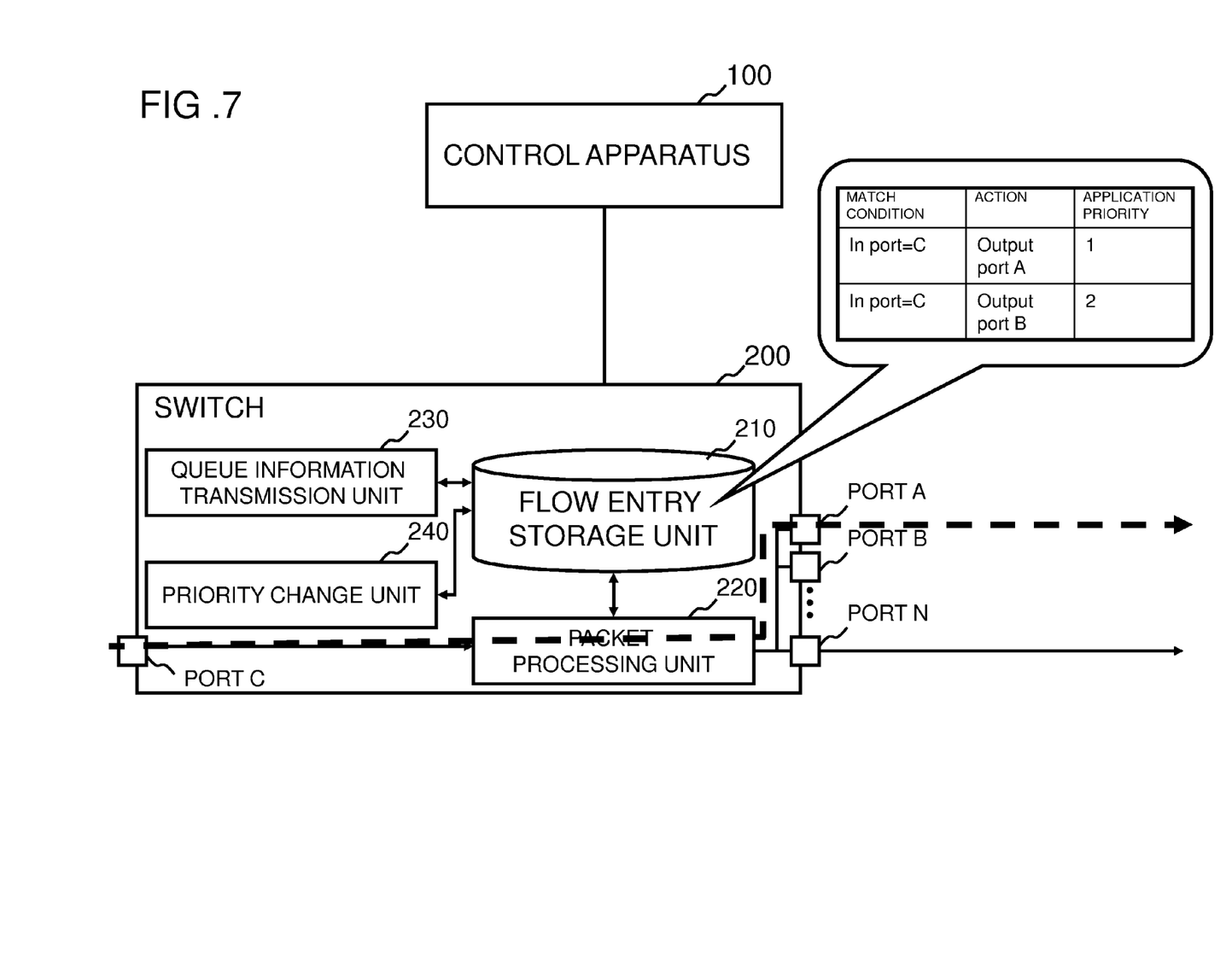
FIG. 7 is a diagram for describing operations of the switch in the first exemplary embodiment of the disclosure.
Figure 8:
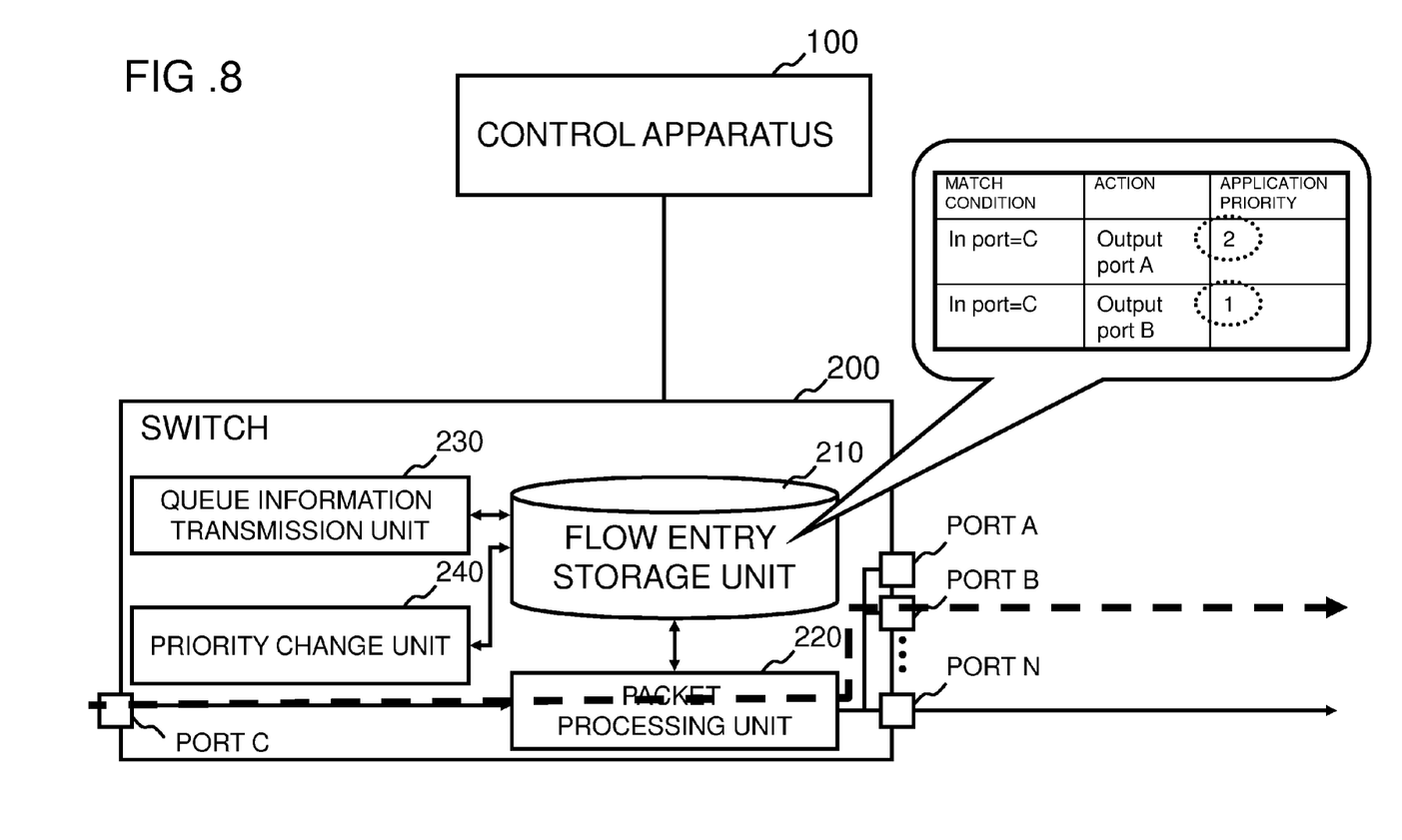
FIG. 8 is a diagram for describing operations of the switch in the first exemplary embodiment of the disclosure.

For example, in a case where a distributed processing flow entry is configured as shown in FIG. 5, the switch 200, on receiving a packet from port C, transmits the packet from port A, as shown in FIG. 7, in accordance with an action field of the flow entry with entry ID=5000. At this time, the switch 200 increments a counter field of the flow entry with entry ID=5000.

Meanwhile, the priority change unit 240 of the switch 200 refers to the counter field of the distributed processing flow entry, and determines whether or not to change the priority of the distributed processing flow entry. For example, in a case where the number of packets received from port C exceeds a specified threshold, the priority change unit 240 of the switch 200 changes the priority of the flow entry with entry=5001 in FIG. 5 to "1", and changes the priority of the flow entry with entry=5000 in FIG. 5 to "2". In this way, on receiving a packet from port C thereafter, the switch 200 transmits the packet from port B, as shown in FIG. 8, in accordance with an action field of the flow entry with an entry ID=5001.

As described above, according to the present exemplary embodiment it is possible to apply different processing in operation on a switch side for a packet group matching a certain match condition. For example, if N is used as a threshold to be compared with the counter, the switch performs an operation to change path or processing content each time N of a certain packet are received.

Figure 9:
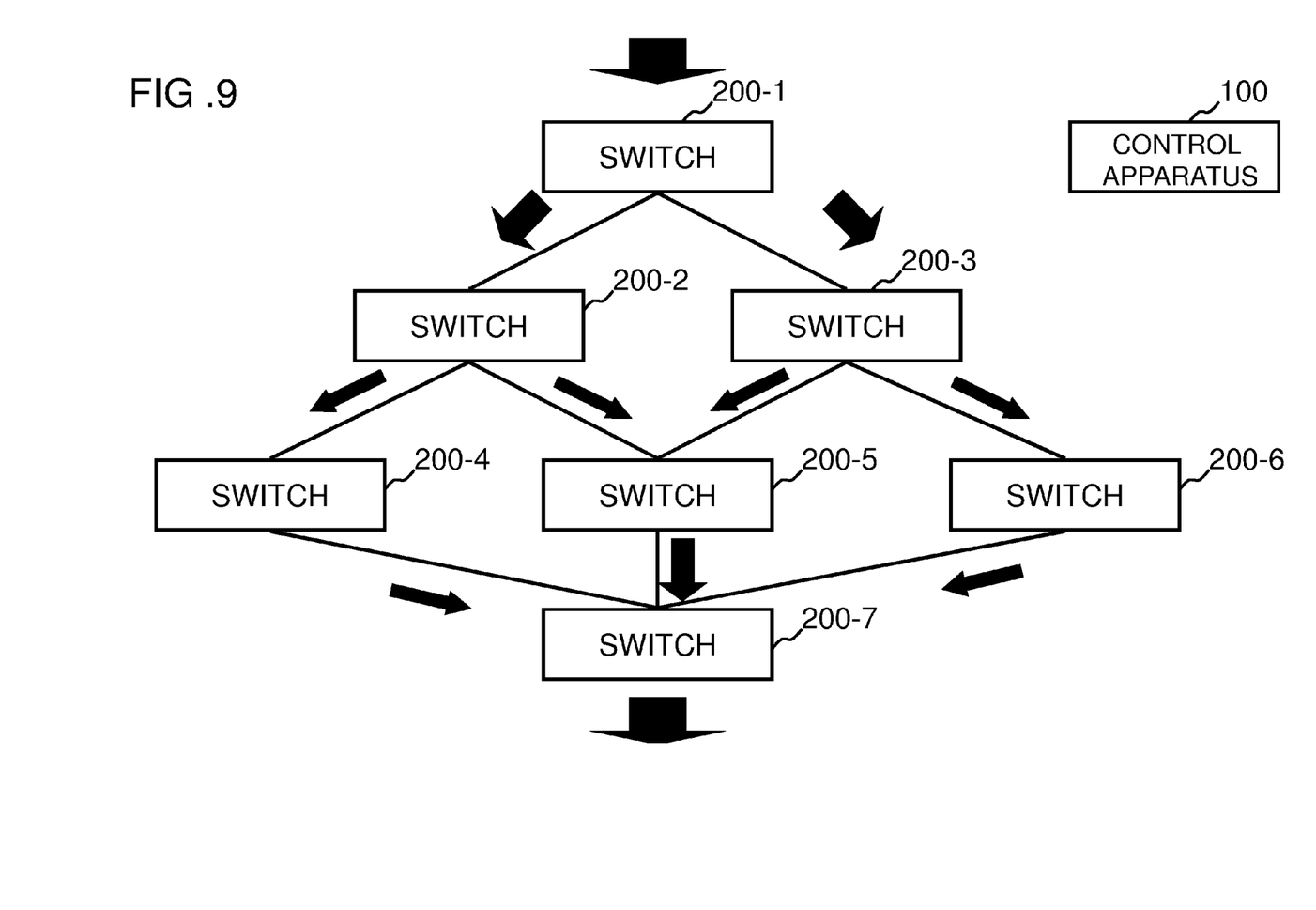
FIG. 9 is a diagram for describing an example of an effect achieved by the first exemplary embodiment of the disclosure.

An effect of the present disclosure is not limited to a case of configuration to 1 switch. For example, as shown in FIG. 9, by configuring a distributed processing flow entry set of a type that switches respective forwarding destinations, in switches 200-1 to 200-6 in a network, it is possible to distribute traffic, as shown by the arrows in FIG. 9. In the example of FIG. 9, the distributed traffic is ultimately concentrated at switch 200-7. Therefore, it becomes possible to reduce the likelihood of dropping at ports along the way, due to congestion or the like.

A description has been given above of respective exemplary embodiments of the present disclosure, but the present invention is not limited to the abovementioned exemplary embodiments, and modifications, substitutions and adjustments may be added within a scope that does not depart from fundamental technical concepts of the invention. For example, network configurations and element configurations shown in the respective drawings are examples in order to aid understanding of the invention, and are not intended to limit the invention to configurations illustrated in the drawings.

For example, in the abovementioned exemplary embodiment, a description was given in which, by referring to the counter field of the distributed processing flow entry, a determination is made as to whether or not to change the priority of a distributed processing flow entry, but, for example, it is possible to provide a timer for the switch 200, and to change application priority of the distributed processing flow entry each prescribed time period. Clearly, it is also possible to configure a compound condition such as changing application priority of a distributed processing flow entry when either or both the elapse of a prescribed time or receipt of a prescribed number of packets, is established.

In a case where the switch 200 has functionality of an OpenFlow switch of Non-Patent Literature 2, it is also possible to create and transmit a distributed processing flow entry, based not on using the abovementioned queue information but on information (number of processing packets for each port, each flow entry) obtained using a flow statistical function thereof.

Finally, preferred modes of the present invention are summarized.

First Mode (Refer to the communication system according to the first aspect described above.)

Second Mode

The communication system according to the first mode, wherein the control apparatus prescribes, as the condition, content to change the application priority each time a counter value set in each flow entry exceeds a prescribed threshold, for the switch.

Third Mode

The communication system according to the first or second mode, wherein the control apparatus prescribes, as the condition, content to change the application priority each prescribed time period, for the switch.

Fourth Mode

The communication system according to any one of the first to third modes, wherein the control apparatus determines a switch to transmit the two or more flow entries and the condition, based on a counter value for each flow entry collected from the switch.

Fifth Mode

The communication system according to any one of the first to fourth modes, wherein the control apparatus collects values of statistical information of packets dropped without being transmitted with regard to respective ports, from the switch; creates, with respect to a flow entry for which output from a port with many of the dropped packets is prescribed, a flow entry to prescribe output from another port having an identical match condition; and transmits the created flow entry and a condition to change application priority among the 2 or more flow entries.

Sixth Mode

The communication system according to the fifth mode, wherein the switch transmits statistical information of packets dropped without being transmitted for each port of the switch, in port units or collectively for each switch, to the control apparatus.

Seventh Mode (Refer to the switch according to the second aspect described above.)

Eighth Mode (Refer to the control apparatus according to the third aspect described above.)

Ninth Mode (Refer to the packet processing method according to the fourth aspect described above.)

Tenth Mode (Refer to the program according to the fifth aspect described above.)

It is to be noted that the seventh to tenth modes described above may be expanded with regard to the second to sixth modes, similar to the first mode.

Note that the various disclosures of the abovementioned Patent Literature and Non-Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Various combinations and selections of various disclosed elements (including respective elements of the respective claims, respective elements of the respective exemplary embodiments and examples, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described herein, arbitrary numerical values or small ranges included in the relevant ranges should be interpreted to be specifically described even where there is no particular description thereof.

REFERENCE SIGNS LIST 100, 100A control apparatus
110 distributed processing flow entry creation unit
120 queue information collection unit
130 protocol processing unit
200, 200-1 to 200-7 switch
210 flow entry storage unit
220 packet processing unit
230 queue information transmission unit
240 priority change unit
A to N port

What is claimed is:

1. A communication system, comprising:
a control apparatus that transmits, to a switch, 2 or more flow entries having an identical match condition but different processing content to be applied, and a condition for changing an application priority among said 2 or more flow entries; and
the switch that holds said 2 or more flow entries and switches application priority in accordance with a condition specified by said control apparatus, to process received packet(s),
wherein the condition specified by said control apparatus includes a threshold regarding a value whose changing amount is not predicted in advance and which is obtained from an object existing in the switch.

2. The communication system according to claim 1, wherein said control apparatus prescribes, as said condition, content to change said application priority each time a counter value set in each flow entry exceeds a prescribed threshold, for said switch.

3. The communication system according to claim 2, wherein said control apparatus prescribes, as said condition, content to change said application priority each prescribed time period, for said switch.

4. The communication system according to claim 2, wherein said control apparatus determines a switch to transmit said 2 or more flow entries and said condition, based on a counter value for each flow entry collected from said switch.

5. The communication system according to claim 2, wherein said control apparatus:
collects values of statistical information of packets dropped, without being transmitted with regard to respective ports, from said switch;
creates, with respect to a flow entry for which output from a port with many of said packets dropped is prescribed, a flow entry to prescribe output from another port having the identical match condition; and
transmits said created flow entry and a condition to change application priority among said 2 or more flow entries.

6. The communication system according to claim 1, wherein said control apparatus prescribes, as said condition, content to change said application priority each prescribed time period, for said switch.

7. The communication system according to claim 6, wherein said control apparatus determines a switch to transmit said 2 or more flow entries and said condition, based on a counter value for each flow entry collected from said switch.

8. The communication system according to claim 6, wherein said control apparatus:
collects values of statistical information of packets dropped, without being transmitted with regard to respective ports, from said switch;
creates, with respect to a flow entry for which output from a port with many of said packets dropped is prescribed, a flow entry to prescribe output from another port having the identical match condition; and
transmits said created flow entry and a condition to change application priority among said 2 or more flow entries.

9. The communication system according to claim 1, wherein said control apparatus determines a switch to transmit said two or more flow entries and said condition, based on a counter value for each flow entry collected from said switch.

10. The communication system according to claim 9, wherein said control apparatus:
collects values of statistical information of packets dropped, without being transmitted with regard to respective ports, from said switch;
creates, with respect to a flow entry for which output from a port with many of said packets dropped is prescribed, a flow entry to prescribe output from another port having the identical match condition; and transmits said created flow entry and a condition to change application priority among said 2 or more flow entries.

11. The communication system according to claim 1, wherein said control apparatus:
collects values of statistical information of packets dropped, without being transmitted with regard to respective ports, from said switch;
creates, with respect to a flow entry for which output from a port with many of said packets dropped is prescribed, a flow entry to prescribe output from another port having the identical match condition; and
transmits said created flow entry and a condition to change application priority among said 2 or more flow entries.

12. The communication system according to claim/ wherein said switch transmits statistical information of packets dropped without being transmitted for each port of said switch, in port units or collectively for each switch, to said control apparatus.

13. The communication system according to claim 1, wherein the switch includes a queue information transmitter transmitting queue information indicating a counted number of packets dropped.

14. The communication system according to claim 1, wherein said control apparatus collects values of statistical information of packets dropped, without being transmitted with regard to respective ports, from said switch.

15. The communication system according to claim 14, wherein said control apparatus creates, with respect to a flow entry for which output from a port with a number of said packets dropped is prescribed, a flow entry to prescribe output from another port having the identical match condition.

16. The communication system according to claim 1, wherein said control apparatus creates, with respect to a flow entry for which output from a port with a number of packets dropped is prescribed, a flow entry to prescribe output from another port having the identical match condition.

17. A switch, connected to a control apparatus that transmits to the switch 2 or more flow entries having an identical match condition but different processing content to be applied, and a condition for changing application priority among said 2 or more flow entries,
the switch holding said 2 or more flow entries, and switching an application priority in accordance with a condition prescribed by said control apparatus, to process received packet(s),
wherein the condition prescribed by said control apparatus includes a threshold regarding a value whose changing amount is not predicted in advance and which is obtained from an object existing in the switch.

18. A control apparatus that transmits to a switch which holds 2 or more flow entries having an identical match condition but different processing content to be applied, and switches an application priority among said 2 or more flow entries in accordance with a specified condition, to process received packet(s),
the control apparatus transmitting to a switch said 2 or more flow entries and said condition for changing said application priority among said 2 or more flow entries,
wherein the specified condition by said control apparatus includes a threshold regarding a value whose changing amount is not predicted in advance and which is obtained from an object existing in the switch.

19. A packet processing method, comprising:
receiving, from a control apparatus, 2 or more flow entries having an identical match condition but different processing content to be applied, and a condition for changing an application priority among said 2 or more flow entries; and
holding, by a switch, said 2 or more flow entries and switching application priority in accordance with a condition specified by said control apparatus, to process received packet(s),
wherein the condition specified by said control apparatus includes a threshold regarding a value whose changing amount is not predicted in advance and which is obtained from an object existing in the switch.

20. A non-transitory computer-readable recording medium storing thereon a program to execute on a computer that controls a switch that holds 2 or more flow entries having an identical match condition but different processing content to be applied, and switches an application priority among said 2 or more flow entries in accordance with a specified condition, to process received packet(s), said program executing
a process of creating said 2 or more flow entries and a condition for changing the application priority among said 2 or more flow entries; and
a process of transmitting said 2 or more flow entries and said condition to said switch,
wherein the specified condition includes a threshold regarding a value whose changing amount is not predicted in advance and which is obtained from an object existing in the switch.

* * * * *